W. J. IRWIN.

NOZZLE CONTROL FOR TURBINES.

APPLICATION FILED JAN. 16, 1920.

Reissued Apr. 12, 1921. 15,084.

2 SHEETS—SHEET 1.

*Witnesses:*
Edwin Fuch

*Inventor:*
William J. Irwin
by John E. Jackson
his atty.

W. J. IRWIN.

NOZZLE CONTROL FOR TURBINES.

APPLICATION FILED JAN. 16, 1920.

Reissued Apr. 12, 1921. 15,084.

2 SHEETS—SHEET 2.

Witnesses:

Edwin Tyrell

H. B. Beutz

Inventor:

William J. Irwin.

by John E. Jackson.

his Atty.

BEST AVAILABLE COPY

UNITED STATES PATENT OFFICE.

WILLIAM J. IRWIN, OF WILKINSBURG, PENNSYLVANIA.

NOZZLE CONTROL FOR TURBINES.

15,084. Specification of Reissued Letters Patent. Reissued Apr. 12, 1921.

Original No. 1,254,599, dated January 22, 1918, Serial No. 857,031, filed August 17, 1914. Application for reissue filed January 16, 1920. Serial No. 351,982.

*To all whom it may concern:*

Be it known that I, WILLIAM J. IRWIN, a subject of the King of Great Britain, residing at Wilkinsburg, in the county of Allegheny and State of Pennsylvania, have invented certain new and useful Improvements in Nozzle Controls for Turbines, of which the following is a specification.

This invention relates to that class of turbines used for converting any expansible fluid under pressure into useful work.

The object of this invention is to prevent loss of efficiency by throttling the steam or other gaseous fluid and at the same time to limit the flow of steam to that required under the following conditions, viz:—when the turbine is running at light loads; when the back pressure or vacuum is changed; when the initial pressure for operating the turbine is changed. It is also proposed to give an approximate proper expansion ratio of exit to throat area of the nozzle for the following condition, viz:—when there is a decrease in the pressure at the exit of nozzle of a multi-stage turbine operating at partial loads; when the back pressure or vacuum is changed in the turbine; when the initial pressure at which the turbine is operating is changed; and when back pressure or vacuum as well as initial pressure is changed at the same time.

Attempts have been made prior to my invention to accomplish the above objects, but these have been objectionable for the following reasons: In order to obtain a correct expansion ratio of the motive fluid irrespective of the pressure at which the motive fluid passes through the nozzle, the nozzles have heretofore been constructed with collapsible walls so as to reduce the throat area of the nozzle for fluid at lower initial pressure to give the proper rate of steam flow for the load, at the same time attempting to give the proper exit area for the conditions under which the nozzle is working. Such nozzles have been objectionable for the reason that the nozzles were primarily set at the proper angle of inclination with respect to the blades of the rotor. Any movement imparted to the walls of the nozzle had a tendency to destroy the proper angle of inclination of the nozzle to the blades, or, in some cases, where this was not true, the mechanism employed was such that a plurality of nozzles could not be intimately grouped together, and as a result, prohibitive distances existed between individual nozzles and the uniting of the separate streams of motive fluid into practically one stream on to the blades could not be accomplished. Previous devices have also been unsuitable for reëntrant turbines, because the walls of reversing chamber following the nozzle would not be in their proper positions for all loads, while with the invention herein described, the position of the walls of the reversing chamber can be fixed in such position as to be practically correct for all working conditions.

According to my invention, I am enabled to provide means whereby throttling losses are eliminated, the rate of flow is regulated and approximately the proper angle and approximately the proper expansion ratio of the nozzle is obtained, by varying the throat area and the relation of throat to exit area thereof to provide for fractional loads as well as for full load, or to suit the change of operating conditions. I am enabled to accomplish this without disturbing nozzle walls and still have approximately the proper inclination of the nozzles, because the nozzle angle changes very little when working with high velocity for fractional loads. This also permits a close grouping of the nozzles in the steam chest.

My invention also contemplates the provision of means for directing the motive fluid through the nozzle in substantially parallel stream lines so that eddy currents usually present where puppet valves are employed will be eliminated when the valve is partially opened.

Referring particularly to the drawings 17 designates a valve of which there may be one for each nozzle. One form of my

Figure 1:
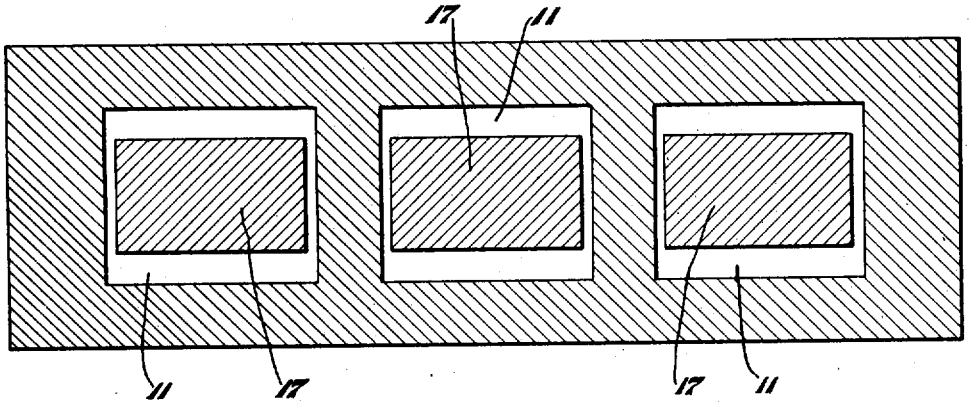
Figure 1 is a cross sectional view through the group of nozzles shown in Fig. 3.
Figure 2:
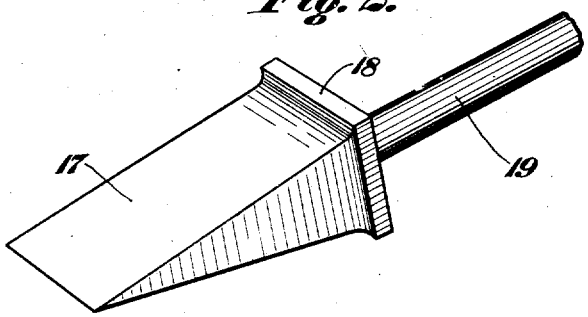
Fig. 2 is a detailed perspective view of one of the valves.

BEST AVAILABLE COPY valve is best shown in Fig. 2 as consisting substantially of a wedge with a valve head 18 to which stem 19 is connected.

The particular form of valve is immaterial so long as it consists of a body portion having a variable cross sectional area and so proportioned with respect to the nozzle that it may extend a considerable distance thereinto and be adapted to progressively vary the port or throat area of the nozzle and also the expansion ratio of the nozzle to suit different pressures at the nozzle exit.

Various ways, either by automatic or hand control, may be provided for operating the valve or valves 17.

Figure 3:
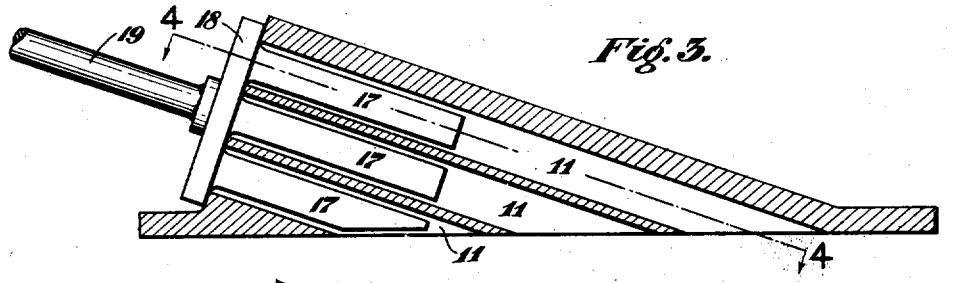
Fig. 3 is a longitudinal sectional view of one form of nozzle control.
Figure 4:
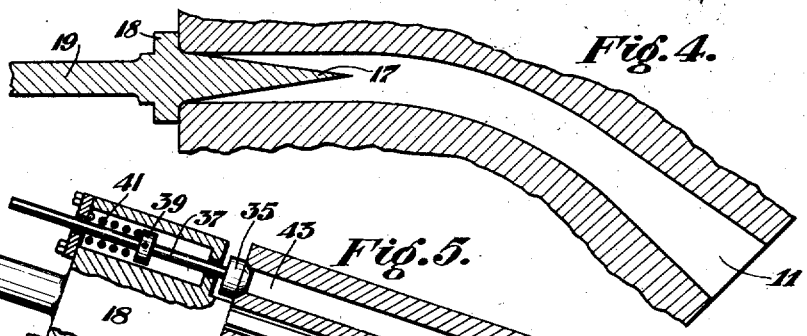
Fig. 4 is a sectional view on the line 4—4 of Fig. 3.

In Figs. 3 and 4, I have shown a form of nozzle control in which there are a plurality of valves 17 in a plurality of nozzles 11, and each valve is connected to a common valve head 18 operated by a single stem 19.

In Fig. 4, the nozzle shown is such that it may remain uniform in area until within a short distance of the end and then will be gradually increased in area, if desired, thus minimizing velocity losses in the nozzle. It is obvious that the nozzles having puppet valve endings or short projections in them (see Figs. 5–7) may be either curved or straight as desired. If so desired, the entrance portion of the nozzle under the puppet valve ends, or short projections, may be considerably larger than the throat and remain so until within ordinary nozzle length of the exit when it will contract to form a throat, and, if necessary, again expand. This gives lower velocity in the first part of the nozzle and reduces losses.

Figure 5:
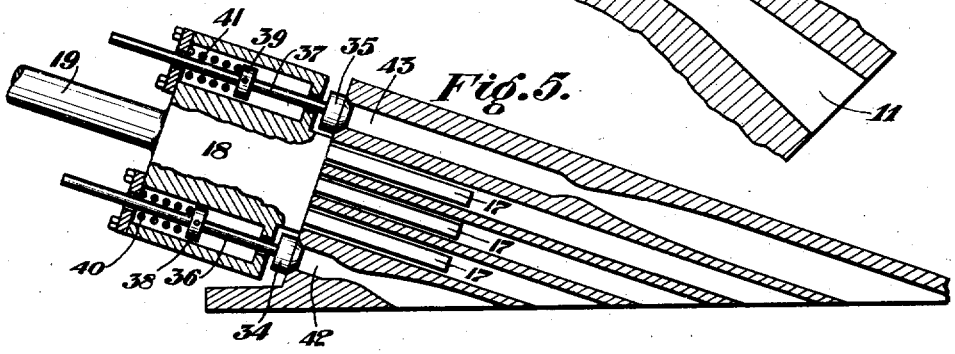
Figs. 5 to 7 are modified forms of nozzle controls.

In Fig. 5 I have shown the valve 17 on a head 18 combined with spring pressed puppet valves 34 and 35, said valves being provided with stems 36 and 37 on which are collars 38 and 39 against which springs 40 and 41 press so that the valves 34 and 35 will be resiliently seated on the seats of their nozzles 42 and 43. With such a construction the valves 34 and 35 will become seated prior to the seating of the head 18 which carries the valves 17. According to this construction, the valves may be so arranged that the wedges 17 are first opened to take care of light loads and then, when a heavy load is imposed upon the nozzle, the puppet valve is opened. A reverse order may be provided if desired.

Figure 6:
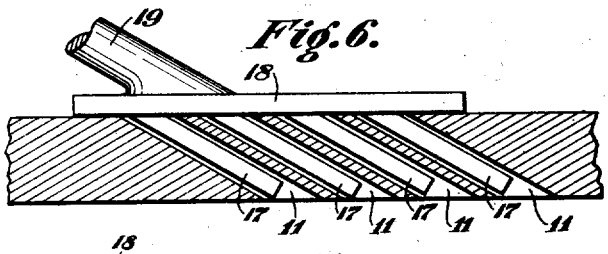

In Fig. 6 I have shown the nozzles 11 of substantially uniform length and the valves 17 of substantially uniform length, the valves 17 being connected to a common head 18 provided with a stem 19. In this form the valves will have the same curvature as their nozzles and as a result the motion of the stem 19 will be slightly spiral.

Figure 7:
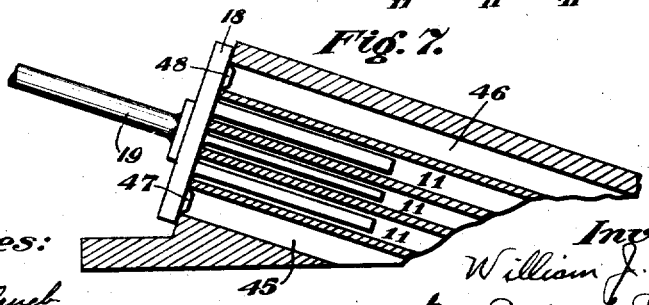

In Fig. 7 I have shown a plurality of intermediate nozzels 11 with nozzles 45 and 46, the nozzles 11 being closed by the valve 17 on the head 18 while the nozzles 45 and 46 may be closed by puppet valves 47 and 48 rigid on the head 18 which is also provided with a stem 19.

Where it is desired to carry overload on a turbine and yet to employ but a single valve, it may sometimes be necessary to make the end of the nozzle a little larger at the entrance than toward the intermediate portion thereof and then increase the size of the nozzle at the exit in order to give proper expansion ratio to suit conditions. According to such a construction, at full load the valve wedges remain partially within the nozzle entrance, while for overload the wedges will be completely withdrawn so as not to in any manner effect the entrance of the motive fluid into the nozzles through which they pass into the turbine.

From the foregoing it will be obvious that the disadvantages of having a sudden drop in pressure at the entrance of the nozzle due to throttling and the encountering of eddy currents in the operation of the turbine will be prevented by employing valve control in accordance with my invention. It will also be apparent that the nozzles and valves jointly will provide approximately proper expansion ratio of the steam or other expansive fluid at the particular pressure under which the turbine is operated. In other words, if the pressure at the nozzle entrance remains the same and the pressure at the exit of the nozzle is decreased either by change of back pressure or vacuum, or by changing the load on a multi-pressure stage turbine, approximately the proper expansion ratio will be provided and only the necessary amount of steam will be passed, hence, throttling losses are eliminated. The above is also true if the initial pressure for operating the turbine is changed. Any of the above named devices may be operated by hand control in aiding to produce economy at different loads and under different operating conditions. The motive fluid will also be guided in substantially parallel stream lines against the rotor blades.

I claim:—

1. In a turbine, a plurality of nozzles, a plurality of wedge shaped valves extending within some of said nozzles, a valve head to which said valves are rigidly connected, and puppet valves for others of said nozzles, said puppet valves being resiliently supported on said head.

2. In a turbine, a plurality of nozzles, a plurality of valves having a variable cross-sectional area extending within some of said nozzles, a head to which all of said valves are connected, and puppet valves carried by said head for others of said nozzles.

3. In a turbine, a plurality of nozzles, a plurality of elongated valves extending into

BEST AVAILABLE COPY said nozzles, and a common carrier adapted to actuate all of said valves.

4. In a turbine, a plurality of nozzles, elongated valves extending into some of said nozzles, and puppet valves for others of said nozzles, and a common carrier for all of said valves, said puppet valves being adapted to open after said elongated valves have opened an appreciable distance.

5. In a turbine, a plurality of nozzles, elongated valves extending into some of said nozzles, and puppet valves for others of said nozzles, and a common carrier for all of said valves, some of said valves being adapted to open after others of said valves have opened an appreciable distance.

6. In a turbine, a plurality of nozzles, at least one of said nozzles being controlled by an elongated valve extending therein, at least one other of said nozzles being controlled by a puppet valve, and a carrier common to all of said valves.

7. In a turbine, a plurality of nozzles, a plurality of valves each of variable cross-sectional area extending into said nozzles for an appreciable distance, and a carrier common to all of said valves.

8. In a turbine, a plurality of nozzles having channels rectangular at exits, a plurality of valves each of variable cross-sectional area, extending into said nozzles for an appreciable distance, and a carrier common to all of said valves.

9. In a turbine, a plurality of nozzles, an elongated valve of variable cross-sectional area, extending into one of said nozzles, a puppet valve for one of said nozzles and a carrier common to said valves.

10. In a turbine, a plurality of nozzles having rectangular passages at exits, an elongated valve of variable cross-sectional area extending into one of said nozzles, a puppet valve for one of said nozzles, and a carrier common to said valves.

11. In a turbine, a plurality of nozzles, an elongated valve of variable cross-sectional area extending into at least one of said nozzles, a puppet valve for at least one of said nozzles, and a carrier common to said valves, the elongated valve being held against relative longitudinal movement with respect to said carrier, and the puppet valve being resiliently supported by said carrier.

12. In a turbine, a plurality of nozzles having rectangular passages at exits, an elongated valve of variable cross-sectional area extending into one of said nozzles, a puppet valve for one of said nozzles, and a carrier common to said valves, the elongated valve being held against relative longitudinal movement with respect to said carrier, and the puppet valve being resiliently supported by said carrier.

13. In a turbine, a plurality of nozzles, a plurality of valves for said nozzles, a common carrier for said valves adapted to reciprocate the same, some of said valves having longitudinal movement with respect to said carrier so as to open at a later time than others of said valves.

14. In a turbine, a plurality of nozzles, a plurality of valves each of variable cross-sectional area extending into said nozzles for an appreciable distance, and a common carrier to which all of said valves are rigidly connected.

15. In a turbine, a plurality of nozzles, valves for each of said nozzles, at least one of said valves being elongated and of variable cross-sectional area and extending an appreciable distance within a nozzle, and a carrier common to said valves.

16. In a turbine a plurality of nozzles and valves for each of said nozzles, at least one of said valves being elongated and having a variable cross sectional area, and a carrier common to all of said valves.

In witness whereof, I have hereunto signed my name.

WILLIAM J. IRWIN.

Witness:

JAS. G. WELDON.